May 1, 1934.  E. H. JOHNSON  1,956,719
STRAINER
Filed May 20, 1931
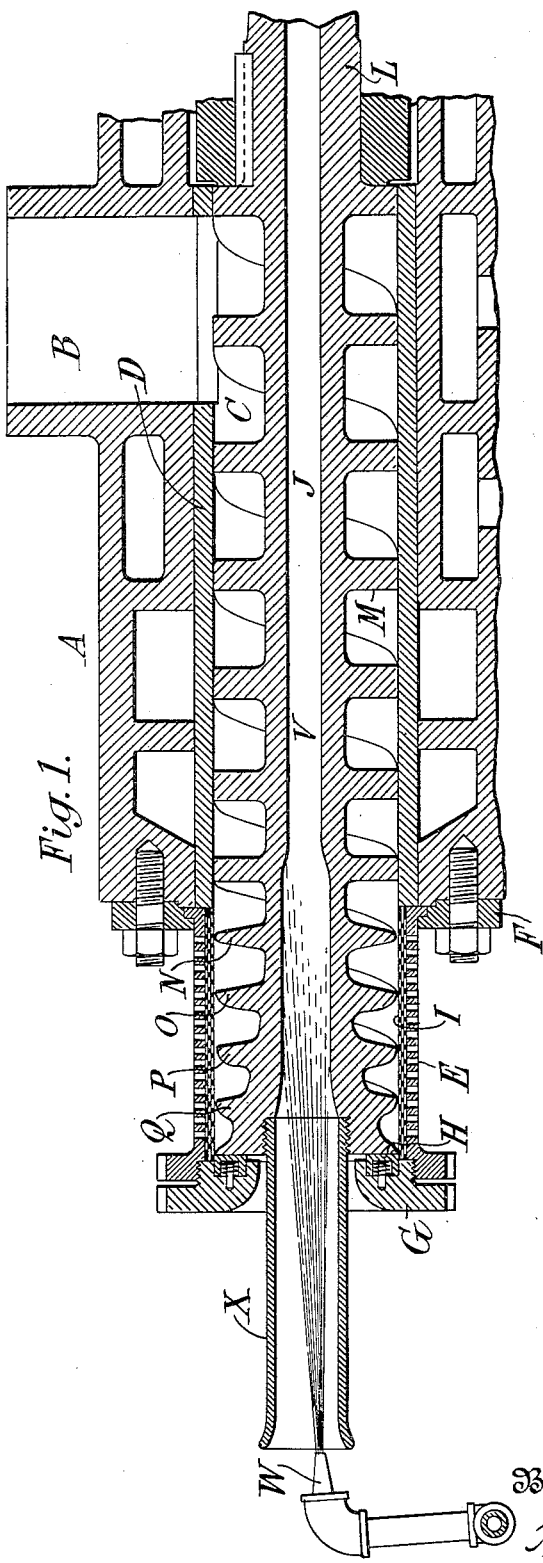
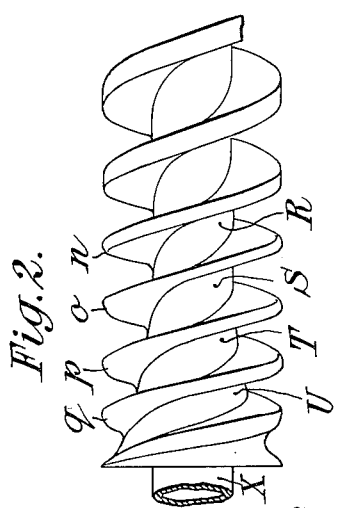
Inventor
Emil H. Johnson,
By his Attorneys Patented May 1, 1934

1,956,719

UNITED STATES PATENT OFFICE 1,956,719

STRAINER

Emil H. Johnson, Ansonia, Conn., assignor to Farrel-Birmingham Company, Incorporated, Ansonia, Conn., a corporation of Connecticut Application May 20, 1931, Serial No. 538,753

3 Claims. (Cl. 146—174)

This invention relates to strainers for rubber, rubber compounds and the like, and aims to provide certain improvements therein.

The present invention provides a construction of machines for straining rubber, rubber compounds or the like, wherein there is a lateral straining sleeve and wherein the forward feeding means is a screw, the main threads of which are so constructed as to put a longitudinal pressure upon the material, and the end threads of which (or those which operate within the strainer), are formed to exert a powerful transverse pressure upon the material so as to assist in forcing the same through the laterally arranged strainer.

The invention also comprises certain other features of construction which will be hereinafter more fully described.

In the drawing which illustrates one form of the invention,—

Figure 1 is a vertical section taken through the axis of the screw of the preferred form of the invention.

Fig. 2 is a side elevation of the screw member detached.

Referring to the drawing, let A indicate a suitable housing having a feed hopper B, leading to a cylindrical bore C which is best provided with a separable lining sleeve D. At the end of the bore is located a strainer sleeve E having a multiplicity of openings, which strainer sleeve is held on the housing A by a collar F engaging a flange on the sleeve. The opposite end of the strainer sleeve is provided with a plate G, shown as screwing in the sleeve, the plate carrying a spring-mounted ring H. Between the inner side of the plate G and the end of the liner D are confined several sleeves of straining material I which may be of any approved construction. Within the liner D is a screw J, the extreme outer end of which bears against the ring H and the extreme inner end of which (to the right in Fig. 1) is prolonged and connected with any suitable driving mechanism, by which it is turned. Suitable thrust bearings are arranged at the right to take the main thrust on the screw.

In the main the screw is designed with a thread portion M, the function of which is to feed the material from the hopper longitudinally along the liner toward the strainer, and the shape of the screw is so selected that pressure is largely in a forward direction. In the construction shown the advancing edges are shown as substantially perpendicular to the axis of the screw throughout their width, thus insuring that the main pressure on the material is forward. At or about the beginning of the strainer section, however, the character of the screw thread is changed, as indicated in the convolutions N, O, P and Q. These convolutions are so designed as to provide a very powerful transversely acting power factor into the thread, which acts to produce an intense pressure on the stiff compound, so as to force it laterally through the strainer by resolving it into a thin film between the outer edges of the convolutions and the strainer. The convolution N is of ordinary type, differing from the convolutions M chiefly in that the sides of the convolutions are tapered and the edge is rounded. The element of transverse force produced by this convolution is very slight. In the convolution O it will be seen that as compared with the convolution N, the advancing edge of O is thickened, and provides an extended and quite acute angular surface o, preferably rounded as shown. The convolution P is still more thickened toward its outer edge so that there is a wider area of transversely acting surface indicated at p. The convolution Q may be approximately the same as P, or may be slightly more acute in its advancing surface. The transverse squeezing area thus provided may be progressively more acute.

In the claims I have used to designate the form of the advancing edge of the convolutions O, P and Q the term "relatively broad and acute angular squeezing space" or words to similar effect. This language is used to distinguish from the ordinary convolutions used on strainer worms which are in general of the shape of the convolution N shown in Figure 1. Such convolutions or threads on worms have been customarily designed for use with a fairly broad base and tapering apex or outer edge, in order to produce the necessary strength of construction required for pressure purposes. The outer edge has been very frequently rounded, so that for a very short area it might be said to form with a surrounding cylinder an acute angular space. But this space is not extended or broad, and has no substantially greater effect than to urge the material forward along the line of the screw. So far as I am aware, there has been no straining device provided in which the convolutions themselves have been thickened and shaped at their outer edges to produce a powerful side wedging action or smearing of the material against the strainer. In certain cases where the base cone of the screw or worm has been tapered in diameter, the convolutions of the worm have been necessarily made radially shorter, but this has not provided the shape of convolution which forms the most important feature of my invention.

The result of this construction is that as the material enters the strainer it is forced to an increasing degree transversely outward through the strainer, the action being a direct pressing or forcing one, as distinguished from a piling up of the material at the extreme end of the screw, which would create only an indirect and partially outward pressure in a radial direction.

Preferably the internal diameter of the screw shaft is progressively increased toward the extreme outer end of the screw, as shown at R, S, T, and U in Fig. 2, for instance. This of itself introduces a lateral wedging movement which assists in the transverse pressure on the material.

The invention also includes a novel form of cooling device for the screw which comprises a core V made in the screw member itself, into which cooling or heating fluid is introduced. A spraying pipe may be inserted into the core, but by preference I use a nozzle W which forces a jet of fluid into the interior. This fluid may find its exit at the extreme right-hand side of the screw member, although a portion of the water may drain back through the left-hand end. In adopting this construction it is best to provide a guiding tube X for the water which is shown as screwed into the left-hand end of the screw. In either case if this method of cooling is employed, an aperture will be left in the plate G, through which the water may pass, preferably through the tube X which also passes through said aperture. In order to avoid leakage of the material being operated on out through the end of the screw and through the aperture in the plate G, the left-hand end of the screw is flattened, and bears against the ring H, so as to form in effect a packing for this purpose. Any other form of packing may be adopted.

It will, of course, be understood that the invention is useful in straining any materials which may require to be strained.

While I have shown and described one form of the invention, it will be understood that I do not wish to be limited thereto, since various changes may be made therein without departing from the spirit of the invention.

What I claim is:

1. A strainer for rubber compounds or the like, a strainer sleeve, a screw having one end extending into such strainer, a plate at the extreme end of the strainer, a spring ring carried by said plate against which such extreme end of the screw abuts, a bore formed in the screw, and a nozzle for cooling fluid adapted to direct the latter into said bore through an opening in said plate.

2. A strainer for rubber compounds or the like, comprising a straining means, and a screw having a threaded portion projecting into the interior of said straining means, the convolutions of said threaded portion being thickened at their outer edges and shaped to provide at such outer edges a squeezing area which with the strainer forms a relative broad and acute angular squeezing space, whereby the material is given a very powerful outward pressure toward said strainer, said convolutions being convexly curved on their advancing sides, and said screw also having in advance of said convolutions a thread having advancing sides substantially perpendicular to the axis whereby the material is fed forwardly with little transverse pressure, and said transverse pressure gradually becomes more and more intense.

3. A strainer for rubber compounds or the like, comprising a straining means, and a screw having a threaded portion projecting into the interior of said straining means, the convolutions of said threaded portion being thickened at their outer edges and shaped to provide at such outer edges a squeezing area which with the strainer forms a relatively broad and acutely angular squeezing space, whereby the material is given a very powerful outward pressure toward said strainer, said convolutions being convexly curved on their advancing sides, and said screw also having in advance of said convolutions a thread having advancing sides shaped to feed the material forward under longitudinal pressure to the thickened convolutions, and said thickened convolutions being increased in thickness to provide more intense transverse pressure toward the end of the screw.

EMIL H. JOHNSON.